(12) United States Patent
Gregoire et al.

(10) Patent No.: US 7,409,393 B2
(45) Date of Patent: Aug. 5, 2008

(54) DATA GATHERING AND DISTRIBUTION SYSTEM

(75) Inventors: Ken Gregoire, Mississauga (CA); Barry Brawn, Bolton (CA)

(73) Assignee: Mybizintel Inc., Toronto, Ontario (CA)

( * ) Notice: Subject to any disclaimer, the term of this patent is extended or adjusted under 35 U.S.C. 154(b) by 500 days.

(21) Appl. No.: 10/900,663

(22) Filed: Jul. 28, 2004

(65) Prior Publication Data

US 2006/0026114 A1    Feb. 2, 2006

(51) Int. Cl.
  G06F 17/30  (2006.01)
  G06F 7/00   (2006.01)
(52) U.S. Cl. .................. 707/10; 707/3; 707/104.1; 707/101; 707/102; 707/5
(58) Field of Classification Search ............... 707/10, 707/3, 104.1, 101, 102
  See application file for complete search history.

(56) References Cited

U.S. PATENT DOCUMENTS

| | | | |
|---|---|---|---|
| 6,618,717 | B1 | 9/2003 | Karadimitriou et al. |
| 6,658,464 | B2 * | 12/2003 | Reisman ................ 709/219 |
| 6,694,307 | B2 | 2/2004 | Julien |
| 2001/0047305 | A1 * | 11/2001 | Bowen, Jr. ............... 705/26 |
| 2002/0032740 | A1 | 3/2002 | Stern et al. |
| 2002/0052928 | A1 * | 5/2002 | Stern et al. ............. 709/218 |
| 2002/0059251 | A1 | 5/2002 | Stern et al. |
| 2002/0091688 | A1 | 7/2002 | Decary et al. |
| 2002/0103737 | A1 * | 8/2002 | Briere ..................... 705/36 |
| 2002/0138525 | A1 | 9/2002 | Karadimitriou et al. |
| 2003/0033274 | A1 * | 2/2003 | Chow et al. .............. 707/1 |
| 2003/0120649 | A1 * | 6/2003 | Uchino et al. ............ 707/5 |
| 2003/0126136 | A1 * | 7/2003 | Omoigui .................. 707/10 |
| 2003/0163463 | A1 * | 8/2003 | Cain ....................... 707/3 |
| 2004/0210558 | A1 * | 10/2004 | Endo et al. .............. 707/1 |
| 2004/0236714 | A1 * | 11/2004 | Eisenberger et al. ...... 707/1 |
| 2005/0165744 | A1 * | 7/2005 | Taylor et al. ............ 707/3 |

* cited by examiner

*Primary Examiner*—Kuen S. Lu
(74) *Attorney, Agent, or Firm*—Patterson & Sheridan, LLP

(57) ABSTRACT

A system and method for gathering and distributing data. The system is for extracting information from the world wide web and classifying the information in accordance with certain profiles. The information may include business intelligence, which may be categorized according to its relevance to predefined industry profiles or company profiles. The information may be further categorized according to its relevance to particular countries. If the information relates to a new company, the system builds a new company profile based upon the information. Users may create a user profile containing their information preferences, such as industry groups or particular countries or companies, and the system provides reports or alerts to the users referencing extracted information that is filtered by the user profile.

10 Claims, 5 Drawing Sheets

DATA GATHERING AND DISTRIBUTION SYSTEM

FIELD OF THE INVENTION

The present invention relates to a data gathering and distribution system and, more particularly, to systems for extracting information from the world wide web and classifying the information in accordance with certain profiles.

BACKGROUND OF THE INVENTION

Reference is first made to FIG. 1, which shows a block diagram of a system 10 for data extraction and classification. The system 10 is connected to a public network 14 containing a variety of interconnected sources. In many embodiments, the public network 14 comprises the Internet and the sources comprise websites within the world wide web. The websites may include a plurality of interlinked webpages. Each website is identifiable by an IP address and its associated domain name, such as, for example, <<http://www.uspto.gov>>, which is the website for the United States Patent & Trademark Office.

The news feeds available through the world wide web are typically geographically specific and rarely provide a consolidated industry wide view. Globally focused news feeds typically ignore business news of interest unless it has a significant industry-wide impact. Accordingly, articles specific to two different parts of the world, but related to the same industry are rarely available from the same source.

One option is to subscribe to a large number of news services; however, few organizations are capable of processing and filtering the volume of incoming information that would result. It would be advantageous to have access to comprehensive, personalized business intelligence to enable more effective business planning and execution. Such a solution may also be desirable outside of the context of business intelligence, i.e. in any context wherein it would be advantageous to receive information from global online sources synthesized and categorized in accordance with personalized needs.

SUMMARY OF THE INVENTION

The present invention provides a system and method for gathering and distributing data. The system is for extracting information from the world wide web and classifying the information in accordance with certain profiles. The information may include business intelligence, which may be categorized according to its relevance to predefined industry profiles or company profiles.

In one aspect, the present invention provides a system for gathering and classifying relevant data from the world wide web. The system includes an extractor for crawling the world wide web and producing extracted information from at least one website. It also includes an industry database containing a list of industry groups, a company database containing profiles of companies, and an information database containing data records, each of the data records having an associated industry group selected from the list of industry groups. The system further includes a classifier for receiving the extracted information, the classified including a company comparison component for determining if the extracted information relates to a company profiled in the company database, and an industry component for determining if the extracted information relates to an industry listed in the list of industry groups, and a classification component responsive to the company comparison component and the industry comparison component for storing the extracted information in the information database as one of the data records.

In another aspect, the present invention provides a system for gathering and classifying relevant data from the world wide web. The system includes an extractor for navigating the world wide web and extracting information from at least one website. It also includes a first memory storing a categorization scheme, the categorization scheme defining a plurality of categories, a second memory storing a plurality of entity profiles, each entity profile being associated with at least one of the categories, and a third memory storing information records, each of the information records having an associated category selected from the plurality of categories. The system further includes a classifier for receiving the extracted information, the classified including an entity comparison component for determining if the extracted information relates to one of the entity profiles, and a categorization component for determining if the extracted information relates to one of the categories, and a classification component responsive to the entity comparison component and the categorization component for storing the extracted information in the third memory as one of the information records.

In another aspect, the present invention provides a method for gathering and classifying information from the world wide web. The method includes steps of providing a categorization scheme of industry groups, extracting information from a website, classifying the extracted information by determining if the extracted information is relevant to at least one of the industry groups, and linking the extracted information with the at least one of the industry groups.

Those of ordinary skill in the art will appreciate that, although the embodiments described below involve gathering, classifying, and relating business intelligence to industry groups/subgroups, countries, and companies, that the present invention is applicable to a wider range of embodiments. For example, a system or method according to the present invention may gather, classify, and relate cuisine information to restaurant/hotel groups/subgroups.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The present invention provides a method and system for extracting information from the world wide web and for classifying that information according to industry, language and country. In some embodiments, the information is further classified by company, if applicable. The system compiles a database of extracted information that is organized or classified by country and/or industry group. The system also identifies new companies, builds a profile for a new company, and classifies the new company according to country and industry group. Users of the system may specify a subset of information, for example news relating to a particular industry, and the system generates and sends a report containing or linking to information the system has located and classified as belonging to the particular industry. Accordingly, the system provides the user with relevant and timely business intelligence.

One or more embodiments of the system and method are described below, but it will be understood by those of ordinary skill in the art that the system and method may be implemented in a wide variety of ways.

Figure 1:
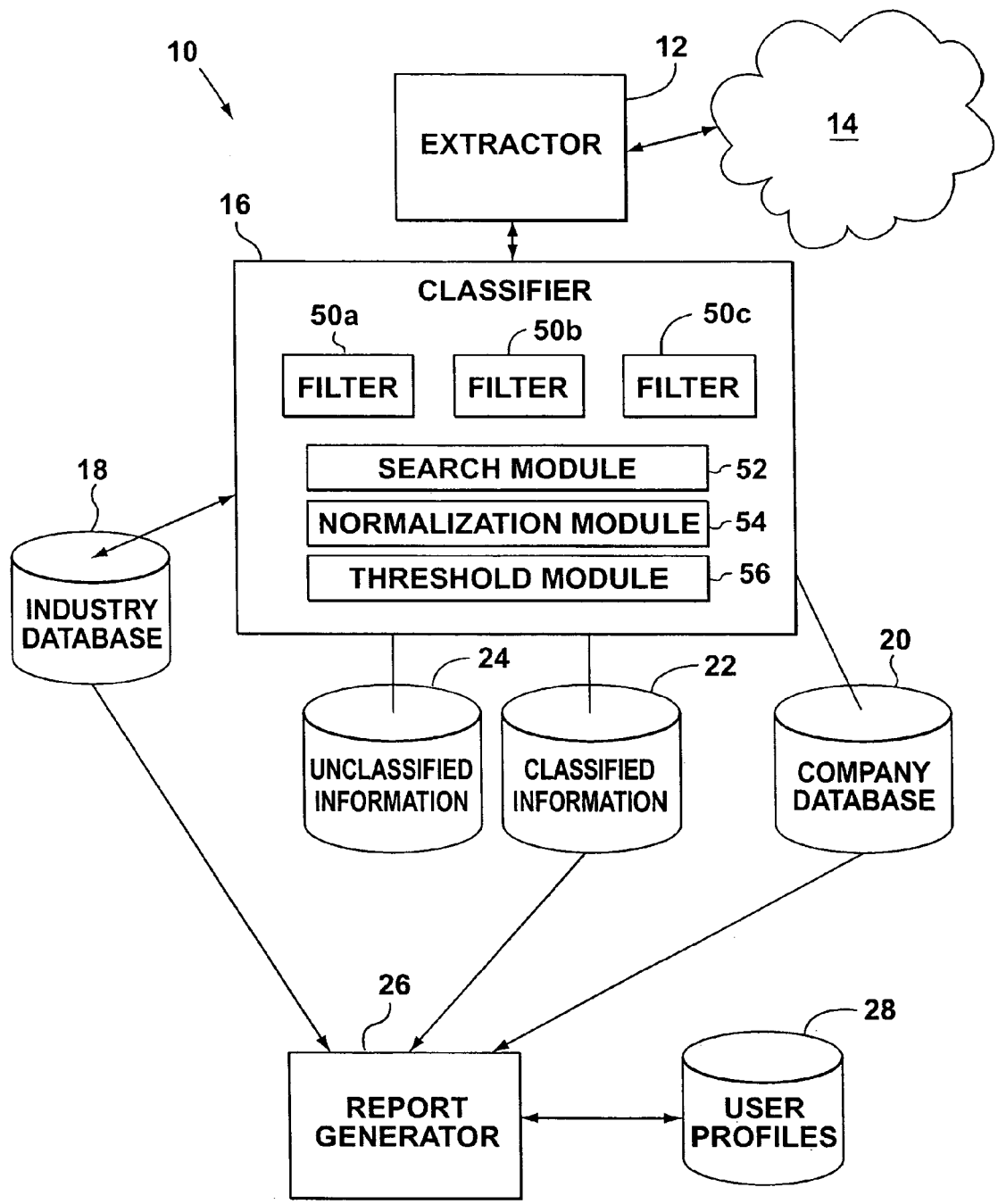
FIG. 1 shows a block diagram of a system for data extraction and classification.

Reference is first made to FIG. 1, which shows a block diagram of a system 10 for data extraction and classification. The system 10 is connected to a public network 14 containing a variety of interconnected sources. In many embodiments, the public network 14 comprises the Internet and the sources comprise websites within the world wide web. The websites may include a plurality of interlinked webpages. Each website is identifiable by an IP address and its associated domain name, such as, for example, www.uspto.gov, which is the website for the United States Patent & Trade-mark Office.

The system 10 includes an extractor 12 and a classifier 16. In general, the extractor 12 extracts information from websites in the world wide web and the classifier 16 relates the extracted information to particular industries or companies and stores the information. The system 10 also includes one or more non-volatile memories storing a number of databases. In particular, the system 10 includes an industry database 18, a company database 20, a classified information database 22, and an unclassified information database 24. The various databases 18, 20, 22, 24 are accessible to, and may be modified by, the classifier 16.

It will be understood that, although described and depicted as separate databases 18, 20, 22, 24, these storage elements may be contained within the same physical memory. Moreover, one or more of the databases 18, 20, 22, 24 may be consolidated into a common database. In other embodiments, the storage elements take alternative forms, such as lists or other data structures stored in non-volatile memory. For example, in one embodiment one or more of the databases 18, 20, 22, 24 comprises XML documents conforming to a predefined XML schema. The use of the term "database" herein is meant to encompass all such possible embodiments.

The industry database 18 identifies one or more industries. In particular, the industry database 18 contains a list of industry groupings in association with which information may be categorized. The industry groupings may include more than one level of classification. For example, the industry groupings may be arranged in a tree-and-branch format, such that a root industry descriptor includes a plurality of sub-industry descriptors associated with subcategories of the overall industry group. By way of non-limiting example, the industry database 18 may specify broad industry categories or groups such as "Financial", "Food & Beverage", and "Healthcare"; and within a broad industry category like "Food & Beverage" there may be subcategories, such as "Beverages", "Food Products", "Food Retailers & Wholesalers", "Restaurants", and "Food Services". It will be appreciated that the subcategories may be further broken into sub- subcategories, etc.

Each industry group, subgroup, etc., within the industry database 18 may be associated with an classification number or code. Each industry group, subgroup, etc., may also be associated with particular keywords that are commonly found in information associated with the group, subgroup, etc. Accordingly, an individual data record within the industry database 18 may include an industry descriptor, an industry classification code, a subindustry descriptor, a subindustry classification code, and associated keywords. Other information may also be included in the individual data record corresponding to a particular industry group, subgroup, etc.

The company database 20 includes a number of company profiles. A company profile includes data regarding a business organization, such as a corporation, partnership, trust, joint venture, etc. The company profile may include data such as the company name, address or addresses, its country or countries of operation or origin, contact information, key personnel and data regarding them, its website, and information regarding the line of business in which the company is engaged. The company profile also includes information regarding with which industry or industries the company is associated. In one embodiment, this means the company profile includes one or more industry classification codes, and may include one or more subindustry classification codes. The industry descriptor, subindustry descriptor, and keyword information may also be extracted from the industry database 18 and incorporated into the company profile in the company database 20.

The extractor 12 includes a crawler or other search or browsing device for locating websites. Upon locating a website, the extractor 12 extracts information from the website. This may include an initial bit of information from a default page at the website so as to be able to determine if the website is a site of interest. It may also include information from other webpages on the website.

The extractor 12 may perform a random crawling of the Internet to locate websites, or it may crawl/search in accordance with a predefined pattern or ruleset. Alternatively or additionally the extractor 12 may locate and extract information from predefined websites, such as known news sites, tradeshow sites, newswires, government sites, etc. The extractor 12 may include more than one crawler.

Those of ordinary skill in the art will be familiar with the variety of crawlers and similar software mechanisms available for locating websites and extracting bits of information from the located websites. As the operations and the programming involved in locating websites and extracting information from websites is well understood in the art, the present application does not provide additional detail regarding this aspect of the system 10.

The extractor 12 provides extracted information from a website to the classifier 16. The extracted information may include, for example, a newswire story or a press release. The classifier 16 receives the extracted information and attempts to classify the information.

To classify the extracted information, the classifier 16 attempts to determine the type of information. It may determine the information type based on the type of domain address, i.e. sites having the suffix .edu are typically universities and other educational institutions. It may also determine the information type based on the metadata or other text on the webpage or website.

The classifier 16 also consults the industry database 20 and attempts to determine if the extracted information is associated with or related to a particular industry or subindustry. It determines this based upon a keyword search within the extracted information. The extracted information may be relevant to one or more industries/subindustries. In some cases, the extracted information may be relevant to none of the industries.

The classifier 16 consults the company database 20 to determine if the extracted information is relevant to one or more companies profiled in the company database 20. This may be accomplished by scanning the extracted information for indicators of relevancy, such as stock ticker symbols, trade names, website URLs, contact information, or other data that relates the extracted information to a particular company. Accordingly, the classifier 16 compares the data stored in the company profiles within the company database 20 to the data within the extracted information. Logic rules may be applied by the classifier 16 to determine a degree of relevance necessary to consider the extracted information to be associated with a particular company.

Finally, the classifier 16 maps the extracted information to a country or countries. It may associate the information with one or more countries based upon the company or companies associated with the information and their associated countries, or it may independently determine the country or countries based upon the content of the extracted information. It may determine the associated countries based upon keyword searching or other similar techniques.

In one embodiment, the classifier 16 includes various filters 50 which it applies to extracted information to remove extraneous words or phrases from the information leaving a subset of extracted information. It further includes a keyword/keyphrase search module 52 for searching the subset of extracted information to identify keywords or keyphrases. The search module 52 may compare the subset of extracted information on the basis of keyword/keyphrase information it obtains from the industry database 18, company profiles, or other sources.

The classifier 16 may also include a normalization module 54 and a threshold module 56. The normalization module 54 compares a number keyword or keyphrase hits with the total number of words or phrases in the subset of extracted information to calculate a degree of concordance or relative fit. The threshold module 56 may determine whether or not to associate a piece of extracted information with a particular industry, company profile, or information type based upon the results of the normalization module 54. The threshold module 56 may apply certain thresholds or factors or weights to assist in making its determination.

The system 10 stores extracted information in either the classified information database 22 or the unclassified information database 24. Extracted information which has been classified as being associated with at least one industry or subindustry is considered classified information. Classified information may further be associated with a particular country and with one or more companies. It will be appreciated that any extracted information that can be associated with a particular company will therefore be associated with the industry relevant to the particular company, since each company profile references at least one industry or subindustry group.

Extracted information which cannot be classified as belonging to a particular industry or subindustry may be discarded or may be stored in the unclassified information database 24 for later review and categorization. The extracted information contained within the unclassified information database 24 may be used to further refine or expand the industry database 18 and/or the company database 20 with additional categories, keyword, profiles, etc.

The classified information within the classified information database 22 may include extracted information that has been classified, or a link to the website or webpage containing a particular piece of extracted information. The extracted information (or links to it) is stored in association with the classification data determined by the classifier 16. For example, it may be stored with the codes for the industries or subindustries with which it is associated. Alternatively, the classified information database 22 may be structured to store data within industry/subindustry groupings. Accordingly, extracted information relating to more than one industry may be stored in multiple locations within the classified information database 22 if it is relevant to more than one industry/subindustry.

In one embodiment, extracted information that has not been associated with a particular company but that has been classified as related to an industry or subindustry may be stored in the classified information database 22 according to its type. Similar types of information may be grouped together, such as news reports, research reports, trade opportunities, government legislation, industry reports, etc.

In addition to storing the extracted information with its associated industry information, information regarding its associated companies is also stored. This may include links to the associated company profiles in the company database 20. In another embodiment, the company database 20 is updated to add a link in a particular company profile to its associated classified information in the classified information database 20.

Those of ordinary skill in the art will appreciate that there are a number of techniques and mechanisms for establishing links between or associations between the classified information and its associated industries, companies, and countries. In addition to storing this classification data with the classified information, other data is also stored in association with the classified information, including the type of information, the date of acquisition/update, and its source (i.e. website or webpage address).

The system 10 may further include a report generator 26 and a user profile database 28. The system 10 includes an interface (not shown) through which users access the system 10 and create a user profile. The user profile is stored in the user profile database 28. The interface may include a website that the user may access from a remote site over the Internet. Using a conventional web browser, the user may access the website and submit information to generate a user profile. The user profile specifies particular information that the user is interested in receiving. For example, a user may be interested in particular industries, subindustries, companies, countries, types of information, or combinations or subcombinations thereof. Accordingly, the user profile specifies the conditions that information must meet to be relevant to a particular user. In this sense, the user profile is akin to a user-customized information filter. The user profile may further specify user preferences, such as for example notification or reporting frequency.

The report generator 26 creates reports or notifications based upon the user profiles stored in the user profile database 28. The reports or notices contain or link to the classified information in the classified information database 22 that meets the user profile conditions. In other words, the report generator 26 filters the contents of the classified information database 22 based upon the user profiles.

The report generator 26 may generate reports or notices for a user at regular intervals or whenever new data relevant to the user is added to the classified information database 22. The reports or notices may also include any new information or updates to the industry database 18 and/or the company database 20. For example, a report may draw a user's attention to a new company located by the system 10 in an industry in which the user is interested.

Each user profile may include a stored time and date of the most recent report or notification sent or generated for the user. The report generator 26 may use this information to filter out any "old" information in the classified information database 22 so that the report or notice only includes information obtained or updated since the previous report.

The keywords or keyphrases associated with a particular industry or subindustry contained in the industry database 18 may be identified in accordance with an extraction process. Based upon a set of known company profiles, wherein the companies are known to be associated with a particular industry and contain verified and accurate information, keyword or keyphrases associated with the industry may be extracted and stored in the industry database in association with the industry or subindustry.

The extraction process first includes a filtering step. The filtering step includes applying one or more filters to a company profile to remove extraneous words or phrases. For example, a name filter may be applied to remove names from the profile. Proper names may be identified as those words having a capitalized initial, although the first word of a sentence may optionally be excluded from the filter. Another filter that may be applied is a common word filter to remove common conjunctive words such as "the", "and", "a", "with", "that", "an", etc. Yet another filter that may be applied is an action verb filter. This type of filter may remove active words and phrases that are not common to an industry, such as "assigned", "collected", "merged", "pioneered", "combined", "briefed", etc. Other filters for removing extraneous information may also be used.

Once the filters have been applied to the company profile, then a subset of company information remains. This subset of company information may contain keywords or keyphrases that are common to most companies in associated industry.

By way of example, an initial company profile may read:
"NEWCO Inc. develops, markets and licenses the NEWCO software product suite, an integrated set of customer relationship management (CRM) software products. The Product Suite consists of the principal product lines: NEWCO Marketing, NEWCO Sales and NEWCO Service. With products from each of these product lines, customers may also license certain analytical CRM capabilities, including its NEWCO PRODUCT for batch-based, online analytical processing and data mining analysis and its NEWCO Interactive Advisor products for real-time data analysis. The Company's Interactive Advisor products use a combination of historical, personal and contextual data to create a real-time customer profile, and then apply a unique combination of real-time analytics and business rules to deliver the highest-impact communications at the moment of customer interaction. It then measures the results and continuously adjusts itself to improve effectiveness over time."

After applying the three filters described above, the company profile may be reduced to the following subset of company information (wherein the delimiters identify phrases):
| software product suite | customer relationship management | CRM | software products | product | analytical CRM | batch-based | online analytical processing | data mining analysis | products real-time data analysis | products | historical | personal| contextual data | real-time customer profile | real-time analytics | business rules| customer |

Since NEWCO is a company known to be in the Technology & Software Industry, these words may be considered to be indicative of that industry. Applying the filtering process to other company profiles associated with the same industry may produce a refined set of keywords or keyphrases. Words like CRM or "customer relationship management" may be indicative of a sub-industry like CRM Software.

The keywords or keyphrases for an industry group may also or alternatively be based upon an Industry Glossary. Many industries have a set of known glossary of terms that are specific to or common in the industry. Such glossaries may be available for incorporation into the industry database 18 as a part of the keywords/keyphrases for particular industries.

Figure 2:
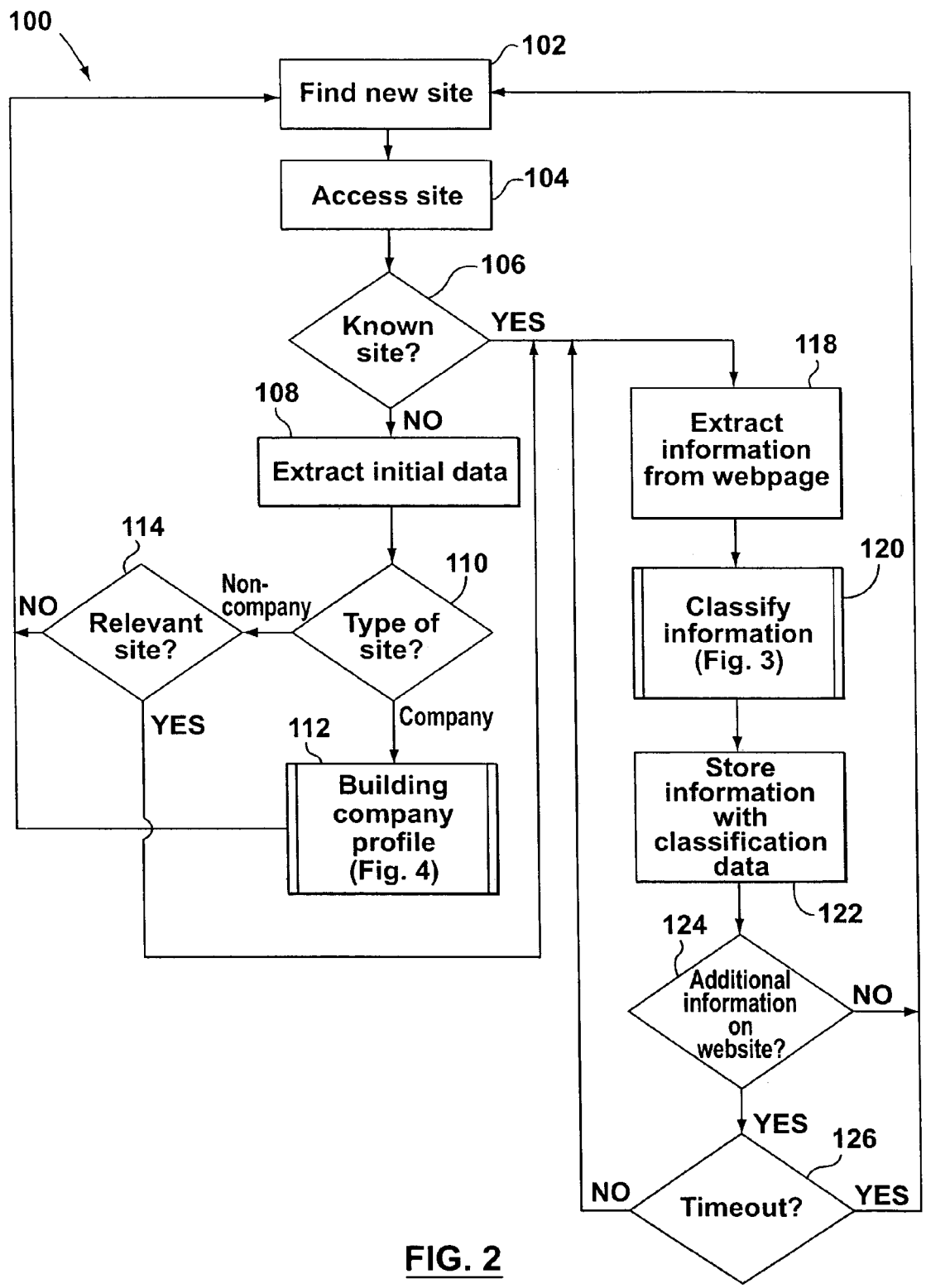
FIG. 2 shows, in flowchart form, a method for gathering and classifying data.

Reference is now made to FIG. 2, which shows, in flowchart form, a method 100 of gathering and classifying data. The method 100 begins in step 102, wherein an attempt is made to locate a website, following which the site is accessed in step 104. This may be performed pseudo-randomly by a webcrawler. It may also or alternatively involve receiving an input address, such as from an administrator or from a stored list of addresses, which may include IP address or their corresponding domain names. Other mechanisms for locating and connecting to random or chosen addresses will be apparent to those ordinarily skilled in the art. Step 104 may involve requesting and receiving the default webpage for the website address. If a more detailed address specifying a particular webpage is obtained in step 102, then step 104 may involve requesting and receiving the specified webpage from the website address.

In one embodiment, wherein a web crawler is employed to test IP addresses for connectivity, the web crawler locates a candidate IP address and a WHOIS or domain name service (DNS) source is interrogated to obtain information regarding the domain name and registrant associated with the candidate IP address. The DNS source may, for example, provide information regarding the registrant's name, which may be a company name, and contact information, including address and personnel information. This information may be used, as described below, to build or update a company profile.

In step 106, based upon the address or the received webpage, the system may determine whether or not this website or webpage is newly discovered. For example, if the website or webpage was reached as a result of an address on a list of predefined websites, it may be a website that the system regularly visits to obtain up-to-date information, such as a newswire service or a corporate press release page. Alternatively, it may be a new address that the system has not yet visited, such as for example a new company website for a company not yet profiled in the company database. The system may maintain a list of previously visited addresses in order to identify known sites/pages as distinct from new sites/pages. If the website is known to the system, i.e. it has been previously visited, then the method continues in step 118.

If the site is new, i.e. not previously visited by the system, then in step 108 the system extracts a set of initial information from the received webpage. The initial information is data available from the webpage which may assist in classifying the webpage or website. It may include, for example, metadata that the website creator has incorporated into the webpage. It may also include WHOIS or DNS information, which may be obtained from third party sources, as described above. Metadata is typically used to get listed with certain search engines and to ensure the website appears in response to certain search terms or strings. Metadata for industry or corporate websites often includes information regarding the company name, industry sector, line of business, products and services, trade names, trade marks, and other keywords related to a particular line of business or activity.

The initial information extracted in step 108 may be used by the system in step 110 to determine the type of website located. In one embodiment, the initial information is used to determine whether the website is a corporate website for a new company, i.e. a company not yet profiled in the company database. If so, then the method 100 continues to step 112, wherein a company profile is built, as described below in conjunction with FIG. 4.

If the website is not a new company website, then the system may further evaluate the type of website and its relevance in step 114. At step 114, the system determines whether or not the website appears to be relevant to the industries and/or companies listed in the industry database and company database. This step may include further searching and extraction of data from the website, which may include the downloading of further webpages from the website. The system may seek to obtain further information from portions of the website that appear promising. For example, the system may look for links or pages that include the text "About Us", "Contact Us", or similar phrases. Such links or pages are more likely to lead to information about the website owner/operator and the type of information reflected in the website.

In step 114, the system may categorize the type of website based upon the initial information obtained from the website, or any additional information if additional extracted information is obtained. The type of website may partially determine its relevance. For example, websites that may have a high degree of relevance include government sites, especially relating to contracts or procurement, news sites, websites for trade associations, trade shows, industry advocacy groups, and post-secondary institutions, especially pages relating to tech transfer offices. Keywords located in the metadata or other portions of the website assist the system in categorizing the website appropriately.

The potential relevance of the website may further be evaluated by determining if it relates to any of the industries or subindustries reflected in the industry database. Similar evaluations may be made for relevance to companies in the company database. For example, a website owned and operated by the Window Manufacturers Association of the United Kingdom may be considered highly relevant to the Construction: Building Materials industry/subindustry and possibly to the Construction: Home Construction industry/subindustry.

Based on any or all of these factors and appropriate thresholds or logic rules, in step 114 the system determines whether or not the website has the requisite degree of relevance. If not, then the method 100 returns to step 102 to locate another website. If so, then it continues at step 118.

At step 118, content is extracted from the received webpage. The system may employ a number of methods of extracting information from a webpage. For example, with unstructured data of an unknown format, the system may attempt to identify keywords that are indicative of high value information sources, such as "press release", "latest news", or similar such words or phrases. With structured data from known sources, the system may apply more focused parsing based upon the known data format. Other methods of identifying and extracting information from a webpage will be apparent to those of ordinary skill in the art.

After identifying a block of extracted information, such as for example a news story, a press release, or a request for proposal (RFP), the system classifies the information in step 120. The step of classifying information is described in greater detail below in conjunction with FIG. 3.

Step 120 includes classifying the information as being relevant to a particular industry and/or subindustry and, possibly, to a particular company. The information may also be classified as being relevant to a particular country.

Following classification, in step 122 the classified information is stored along with its classification data. In step 124 the system determines if the website contains additional information of interest. For example, the website may contain a plurality of news stories or RFPs. If so, then the system proceeds to step 126 where it determines whether or not it has timed out. A timeout procedure may be used to prevent the system from becoming caught or hung up in a particular website. Provided it has not timed out, then the system returns to step 118 to continue extracting information from the website. This may involve navigating to and receiving additional webpages from the website. The navigation may be directed by logic rules that recognize links or pages of potential interest, or it may step through any links it locates in an attempt to traverse the entire site.

If in steps 124 or 126 the system determines that there is no additional information (i.e. webpages) of interest on the website, or that the system has timed out, then it returns to step 102 to locate a new website.

Figure 3:
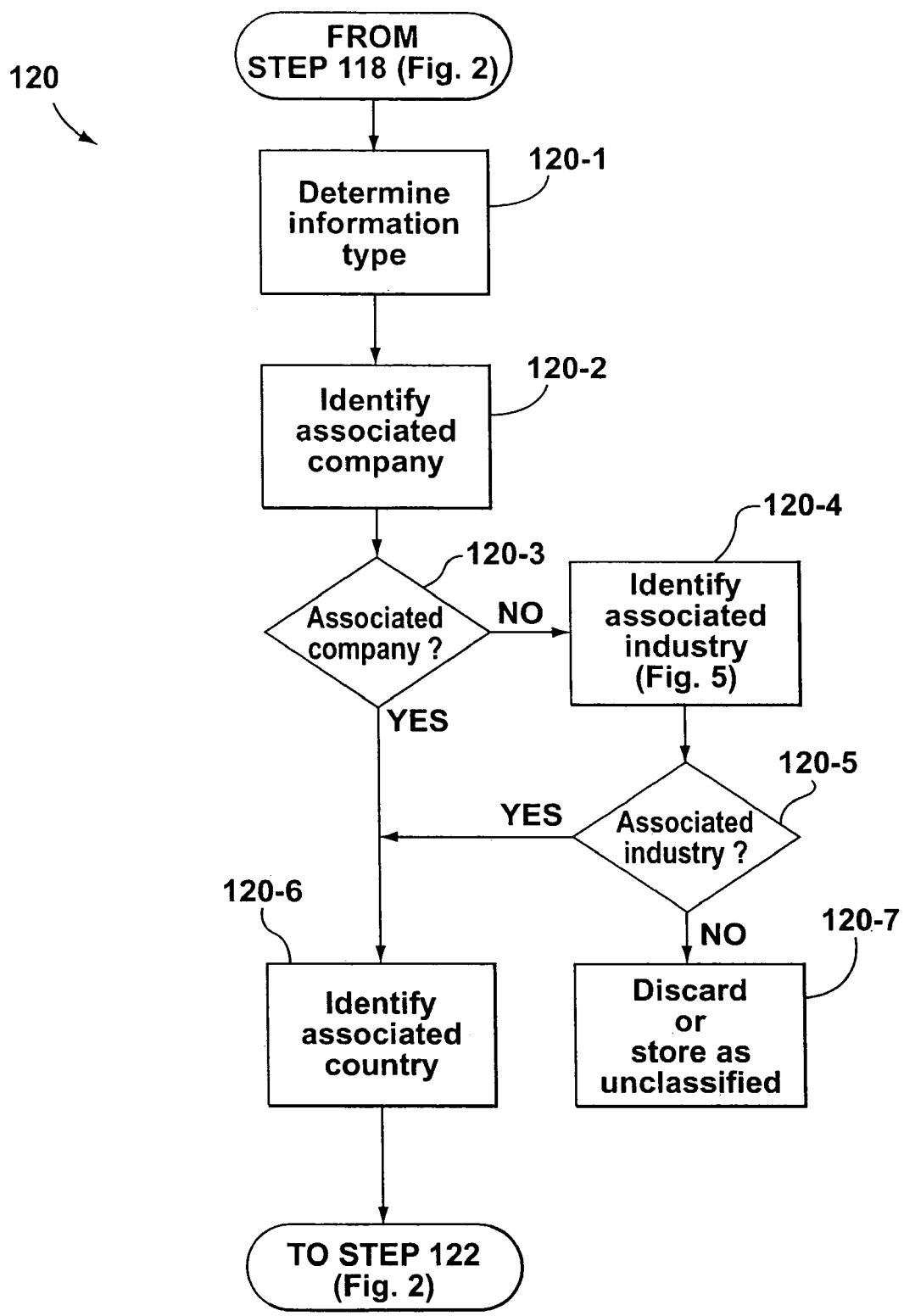
FIG. 3 shows, in flowchart form, a classification method for use in the method of FIG. 2.

Reference is now made to FIG. 3, which shows, in flowchart form, the classification process (step 120 from FIG. 2). The classification process begins in step 120-1 where the extracted information is analyzed to determine its type. In some cases, such as with known websites or webpages, the type of extracted information may already be known. Information types may include news stories, press releases, government industry reports, post-secondary academic research, requests-for-proposal, trade show information, industry group reports, company-specific information, legislation, etc. Additional or alternative types may also be included.

To determine the type of information, the system may scan the information for key words. In determining the type of information, the scanning process may focus upon headings, titles, URLs, metadata, and other similar information that may indicate the character of the extracted information. For example, the system may take into account the type of website, so that if the extracted information was obtained from .edu site or a .gov site the system knows the information came from an educational institution or a government website, respectively. This information may be used to narrow down the possible types of information. Headers or titles within the extracted information, such as "RFP", "Report", etc., may give additional clues as to the type of information.

In step 120-2, the extracted information is analyzed to determine whether or not it relates to a specific company profiled in the company database. This analysis may be based upon keyword or keyphrase searches within the extracted information. Relevance to a company may be indicated through mention of the company's trade name, major product(s), stock ticker symbol, or key personnel. Extracted information may be relevant to more than one company. If one or more companies are associated with the extracted information, then the extracted information is also relevant to the industries/subindustries that are associated with those companies.

In step 120-3, the system evaluates whether or not it was able to associate the extracted information with one or more companies. If so, then its industry relevance is determined based upon the companies and the industries that are relevant to them, and the classification process continues at step 120-6. If not, then the process continues at step 120-4, where the system attempts to determine if the extracted information is associated with a particular industry or subindustry included in the industry database. Again, the system may make this determination based upon keyword or keyphrase searching and in accordance with predetermined logic and threshold rules for assessing a degree of relevance. A method 300 for determining if information is associated with an industry is described further below in conjunction with FIG. 5.

In step 120-5, the system evaluates whether or not it was able to associate the extracted information with one or more industries/subindustries. If so, then the process continues at step 120-6. If not, then the extracted information has been determined to be of little or no relevance to any of the companies or industries profiled by the system and therefore may not be of interest to users. Accordingly, in step 120-7, the system either discards the extracted information or stores it in the unclassified information database. The unclassified information database may be reviewed by an administrator at a later time to determine if any unclassified information should be used as the basis for updating or expanding the industry or company databases.

In step 120-6, the system evaluates whether or not the extracted information is relevant to a particular country. This determination may be based on its relevance to a company associated with the information (if any), where that company has a strong affiliation with a particular country. It may also be based upon the associated industry, if that industry has particular importance to a given country. The determination may also, or alternatively, be based upon keyword or keyphrase searching within the extracted information.

Following step 120-6, the classification process proceeds to step 122 (FIG. 2) within the method 100 (FIG. 2).

Figure 5:
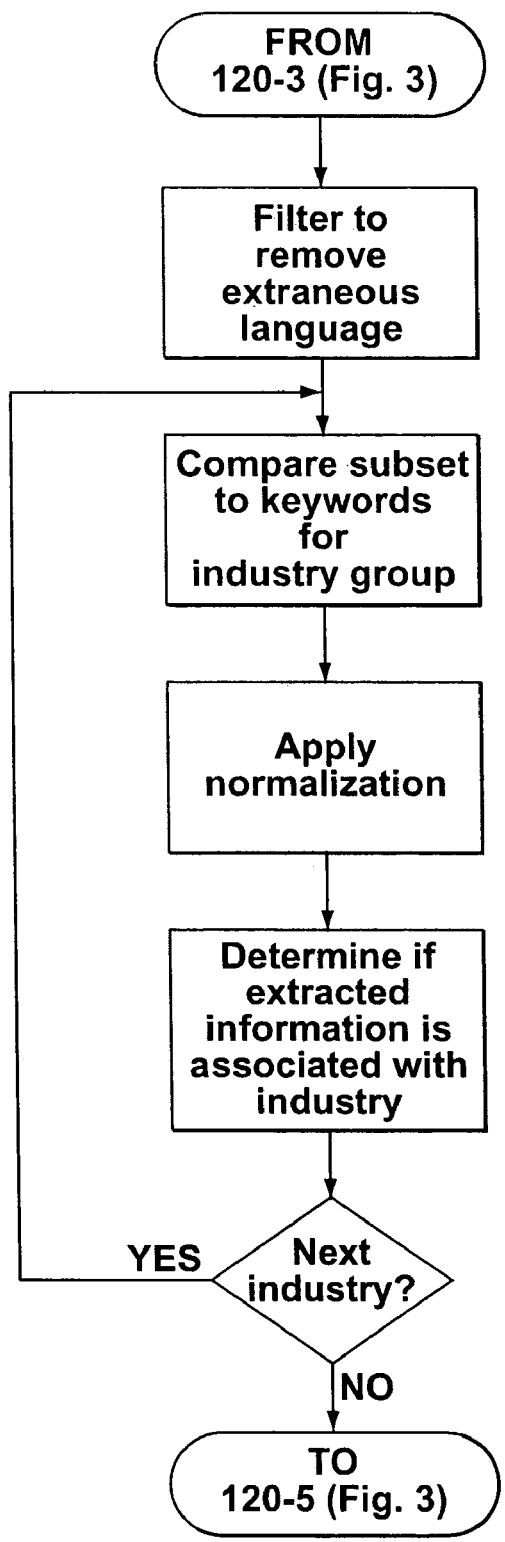
FIG. 5 shows, in flowchart form, a method for determining if information is associated with an industry.

Reference is made to FIG. 5, which shows the method 300 for determining if information is associated with an industry. The method 300 may be employed in step 120-4 (FIG. 3) of the method 100 (FIG. 3).

The method 300 begins in step 302 wherein one or more filters are applied to the extracted information to reduce it to a subset of extracted information. The filters remove extraneous information that is unlikely to be relevant to determining association with an industry. For example, the filters may include a name filter, a common word filter, and/or an action verb filter, as described above in conjunction with FIG. 1. Other filters may also or alternatively be used.

After a subset of extracted information is obtained, in step 304 the subset of extracted information is searched or compared with keywords or keyphrases associated with an industry group or subgroup (subindustry). As described above, the keywords or keyphrases may be obtained from an extraction process using known company profiles, and/or may be based upon an Industry Glossary. In step 304, the number of matching keywords and keyphrases in the subset of extracted information are noted.

In step 306, the count is normalized. This may include dividing the number of matching keywords/keyphrases by the total number of words in the subset of extracted information. This step 306 provides a measure of the relative number concordance between the keywords/keyphrases for an industry and the subset of extracted information. For example, a subset of extracted information containing 100 words and having five matching keywords with a selected industry may have a normalized match value of 0.05.

In step 308, the normalized match value is used to determine whether or not the extracted information is associated with the industry. This may involve comparing the normalized match value with a threshold value. If the normalized match value exceeds the threshold value, then the extracted information is deemed to be related to the industry.

The steps 304, 306, 308 are applied to each of the industries and subindustries in the industry database. In step 310, if no more industries or subindustries are available, then the method 300 is complete.

Figure 4:
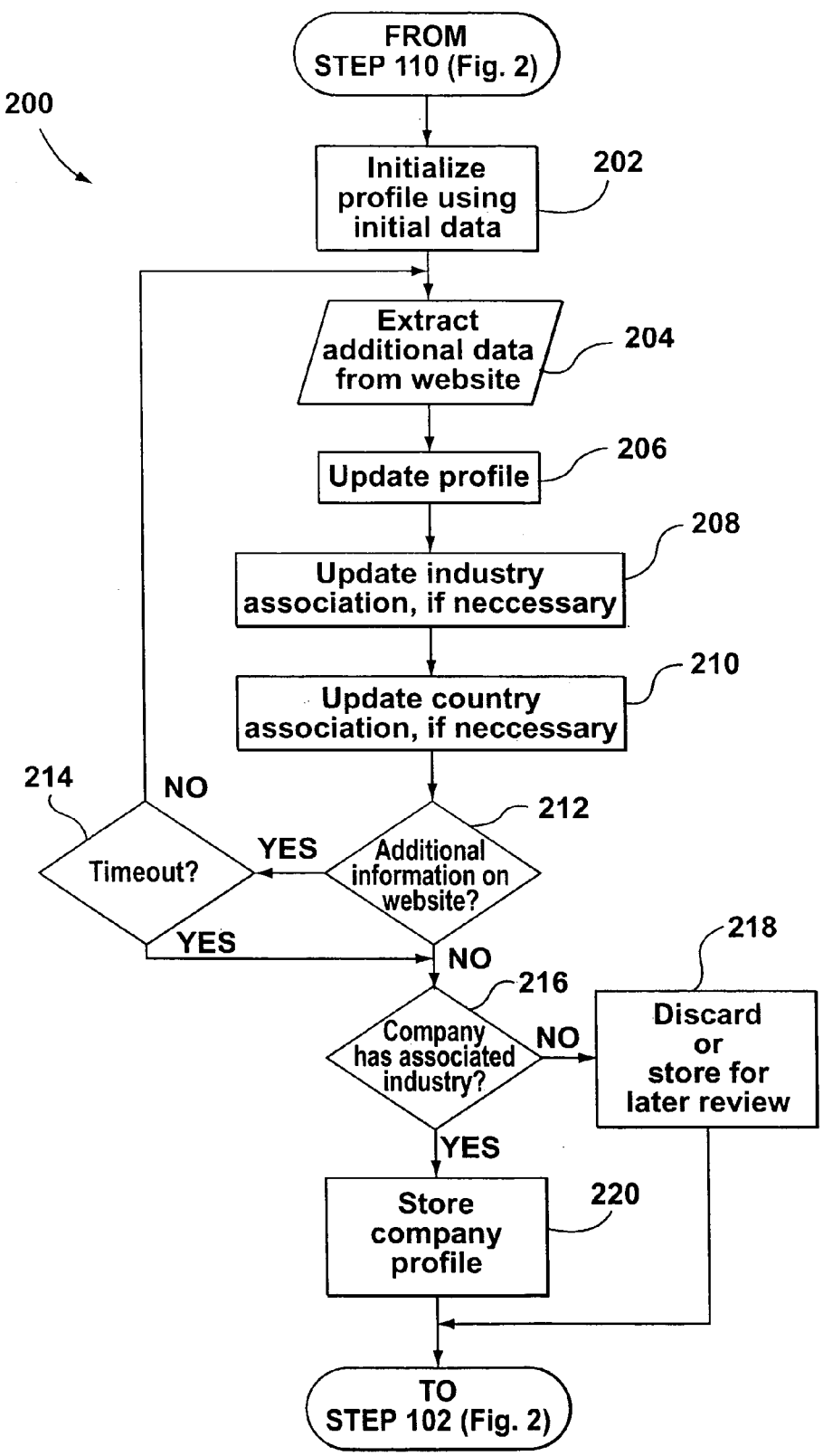
FIG. 4 shows, in flowchart form, a new company profiling method for use in the method of FIG. 2.

Reference is now made to FIG. 4, which shows, in flowchart form, a method 200 of building a new company profile. The method 200 may, for example, be implemented within the context of the method 100 shown in FIG. 2, and in particular in step 112 (FIG. 2).

The method 200 begins in step 202. Having determined that a website located by the system constitutes a new company (step 110 of FIG. 2), the system initializes a new company profile using the initial data from the website/webpage obtained in step 108 (FIG. 2). The initial data may include metadata, WHOIS or DNS information, or other information available from the website/webpage. For example, the WHOIS data may provide information regarding the corporate name, address, contact person, telephone numbers, and country. Accordingly, the initial data may be used to populate certain fields in a company profile form or data structure. The company profile record may comprise an XML document or other structured data element.

By way of example, a website having the domain name <<http://www.new-co.com>> may be located by the system. The WHOIS information may provide the following information:

Domain name: new-co.com
Registrant Contact:
    Other Company
    John Smith (johnsmith@yahoo.com)
    416-555-1212
    Fax: 950-555-1212
    100 Elm St.
    Toronto, ON M3B 2G1
    CA
Administrative Contact:
    Other Company
    John Smith (johnsmith@yahoo.com)
    416-555-1212
    Fax: 950-555-1212
    100 Elm St.
    Toronto, ON M3B 2G1
    CA
Technical Contact:
    Other Company
    John Smith (johnsmith@yahoo.com)
    416-555-1212
    Fax: 950-555-1212
    100 Elm St.
    Toronto, ON M3B 2G1
    CA
Billing Contact:
    Other Company
    John Smith (johnsmith@yahoo.com)
    416-555-1212
    Fax: 950-555-1212
    100 Elm St.
    Toronto, ON M3B 2G1
    CA
Status: registrar-lock
Name Servers:
    ns1.primus.ca
    ns2.primus.ca
Creation date: 30 May 2004 11:20:24
Expiration Date: 30 May 2006 11:20:24

Using the same example, the webpage <<http://www.new-co.com/default.html>> may include metadata having the form:

```
<head>
<meta http-equiv="Content-Type" content="text/html; charset=windows-1252">
<meta name="GENERATOR" content="Microsoft FrontPage 4.0">
<meta name="ProgId" content="FrontPage.Editor.Document">
<title>new-co - custom widget manufacturers </title>
<meta name="Classification" content=" widget, widget manufacturing, manufacturing,
custom widgets, widget design, widget engineering, widget distribution, widget sales">
<meta name="keywords" content="widget, widget manufacturing, manufacturing,
custom widgets, widget design, widget engineering, widget distribution, widget sales">
<meta name="description" content="custom widget design and manufacturing, widget
engineering services, widget distribution and sales for usa, canada, mexico">
<link href="otherco.css" type="text/css" rel="stylesheet">
<!--mstheme--><link rel="stylesheet" type="text/css" href="_themes/blueprint-
newco/blue1000.css"><meta name="Microsoft Theme" content="blueprint-newco
1000, default">
</head>
```

From the metadata and the WHOIS information, the system can obtain a great deal of information regarding the new company. Accordingly, a new company profile data element may be created, such as an XML document or other type of document, populated with the following information:

Company Name & Contact Information:
 Other Company
 Website: www.new-co.com
 John Smith (johnsmith@yahoo.com)
 416-555-1212
 Fax: 950-555-1212
 100 Elm St.
 Toronto, ON M3B 2G1
 CA
Business Profile:
 Title—new-co—custom widget manufacturers
 Profile—custom widget design and manufacturing, widget engineering services, widget distribution and sales for usa, canada, mexico
 Likely products & services—widget, widget manufacturing, manufacturing, custom widgets, widget design, widget engineering, widget distribution, widget sales It will be appreciated that the initial company profile developed based upon the initial data may not be completely accurate. For instance, in the above example the company name may actually be NewCo Inc., but the system has erroneously determined the company name based upon the other corporate name it found in the WHOIS data. Accordingly, in step 204 additional information is extracted from the website. This may involve extracting additional information from the webpage already received from the website, i.e. the default webpage, or other webpages on the website. The extraction may be performed in accordance with a number of logic rules or strategies. For example, the system may search the current webpage for the headings "About Us" or "Contact Us", since these are likely sources of further information regarding the company. It will be appreciated that other headings or indicators of potential information may be used. For example, the new-co.com/default.html page may include a further description regarding the companies activities, such as the following text excerpts:

'About Us'
 NewCo Inc. designs and manufactures standard and custom widgets for a wide variety of applications and installations. Founded in 1964 in Anytown, Ontario, NewCo Inc. has over forty years experience in the widget industry.

'Contact Us'
 140 Birch Lane
 Suite 100
 AnyTown, Ontario L3C 2M8
 Canada
 Tel# 555-555-1212
 Email: Information @ new-co.com This information may be used in step 206 to verify or modify information in the company profile. It may further be used to add information to the profile. Accordingly, following step 206, the company profile may contain the following information:

Company Name & Contact Information:
 Most likely business name: New-Co Inc.

| Most Likely Address: | Secondary Address (likely not related to business profile) |
|---|---|
| 140 Birch Lane | Other Company |
| Suite 100 | Website: www.new-co.com |
| AnyTown, Ontario L3C 2M8 | John Smith (johnsmith@yahoo.com) |
| Canada | 416-555-1212 |
| Tel# 555-555-1212 | Fax: 950-555-1212 |
| Email: Information@new-co.com | 100 Elm St. |
| | Toronto, ON M3B 2G1 |
| | CA |

Business Profile:
 NewCo Inc. designs and manufactures standard and custom widgets for a wide variety of applications and installations. Founded in 1964 in Anytown, Ontario, NewCo Inc. has over forty years experience in the widget industry.
 Title—new-co—custom widget manufacturers
 Profile—custom widget design and manufacturing, widget engineering services, widget distribution and sales for usa, canada, mexico
 Likely products & services—widget, widget manufacturing, manufacturing, custom widgets, widget design, widget engineering, widget distribution, widget sales In step 208, the system assesses whether the extracted information enables the company to be associated with an industry or subindustry defined in the industry database. This may involve keyword search using the keywords associated with each industry defined in the industry database. Other techniques may also be applicable. If possible, an association is established between the company and an industry or subindustry. In one embodiment, this may include storing the industry/subindustry code within the company profile. For instance, with the above example the system may identify a "widget industry" with a subindustry of "widget manufacturing", with which NewCo Inc. may be associated on the basis of keyword matches.

A company may not necessarily become associated with an industry until further extraction of data from the website is performed to reveal its precise line of business. In other situations, the industry/subindustry association may be modified or supplemented as further extraction and analysis is performed.

In step 210, the system assesses whether the extracted information enables the company to be associated with a country. This may be done on the basis of keyword searching. In the above example, the company would be associated with Canada on the basis of its address information.

In step 212, the system assesses whether any additional information is available from the website. In one embodiment, it does this by determining if any additional information extraction is available or desirable from the current webpage and, if not, if there are any links to other webpages on the website. In another embodiment, the system builds a map of links and attempts to traverse the entire website in search of information. In yet another embodiment, the system attempts to intelligently filter out links that are unlikely to provide relevant information. Links that incorporate keywords like "news", "press", "about" or "contact" may be given a higher priority.

If, in step 212, the system determines that additional information may be available, then the method 200 continues in step 214, where the system verifies that a timeout has not expired. A timeout process may be employed to ensure that the system is not hung up or trapped in a large website. Provided the system has not timed out, the method 200 returns to step 204 to extract additional information from the current webpage or other webpages on the website. In steps 206, 208, and 210, the system updates, modifies or supplements the corporate profile and its industry and country associations based upon the newly extracted information.

If, in step 212, it is determined that no additional information is available, then the method 200 continues to step 216 where it evaluates whether or not the new company profile was successfully associated with an industry in step 208. If not, then in step 218 the company profile is discarded or stored in memory for later review. It is not added to the company database since it is unrelated to any of the recognized industries, and therefore is unlikely to be relevant to users. Upon later review, an administrator may determine that the company is of interest to users and may manually associate it with an existing industry or modify the industry definitions to have the company associated with a new industry classification.

If, in step 216, the system recognizes that the new company profile has been successfully associated with one or more industries, then in step 220 the new company profile is stored in the company database and the method 200 returns to step 102 (FIG. 2).

It will be appreciated by those of ordinary skill in the art that some of the above-described steps or procedures may be performed in another sequence or combined without materially affecting the overall methods.

In one example, the industry database 18 (FIG. 1) includes the following industries/subindustries:

| ID  | Industry     | SubID | SubIndustry                      |
|-----|--------------|-------|----------------------------------|
| 825 | Agriculture  | 226   | Crops                            |
| 825 | Agriculture  | 227   | Fishing                          |
| 825 | Agriculture  | 228   | Livestock                        |
| 825 | Agriculture  | 383   | Farms                            |
| 825 | Agriculture  | 384   | Farm services/Supplies           |
| 616 | Automotive   | 370   | Auto: Sales & Leasing            |
| 616 | Automotive   | 371   | Auto: Repair & Maintenance       |
| 616 | Automotive   | 372   | Truck: Sales & Leasing           |
| 616 | Automotive   | 373   | Truck: Repair & Maintenance      |
| 616 | Automotive   | 374   | Body Repair                      |
| 616 | Automotive   | 375   | Engines                          |
| 616 | Automotive   | 376   | Motor Cycles                     |
| 616 | Automotive   | 377   | Wrecking & Recycling             |
| 616 | Automotive   | 378   | Trailers                         |
| 616 | Automotive   | 230   | Mobile Homes, RVs, Special Purpose |
| 616 | Automotive   | 140   | Aftermarket                      |
| 616 | Automotive   | 141   | Machine shops                    |
| 616 | Automotive   | 143   | Automotive Services              |
| 616 | Automotive   | 18    | Auto Parts                       |
| 616 | Automotive   | 19    | Tires                            |
| 616 | Automotive   | 20    | Automobile Manufacturers         |
| 940 | Aviation     | 341   | Airplane Parts/Services          |
| 940 | Aviation     | 342   | Airports                         |
| 940 | Aviation     | 343   | Airplane sales/Leasing           |
| 612 | Chemicals    | 14    | Chemicals, Specialty             |
| 612 | Chemicals    | 13    | Chemicals, Commodity             |
| 687 | Construction | 25    | Home Construction                |
| 687 | Construction | 88    | Building Materials               |
| 687 | Construction | 89    | Heavy Construction               |
| 687 | Construction | 214   | Supplies & Fixtures              |
| 687 | Construction | 390   | Contractors                      |
| 687 | Construction | 391   | Construction Equipment           |
| 687 | Construction | 392   | Recreational Facilities          |
| 687 | Construction | 393   | Commercial Construction          |
| 687 | Construction | 394   | Industrial Construction          |

-continued

| ID | Industry | SubID | SubIndustry |
|---|---|---|---|
| 800 | Consumer Products | 471 | Communications |
| 800 | Consumer Products | 472 | Video |
| 800 | Consumer Products | 473 | Photography |
| 800 | Consumer Products | 474 | Audio |
| 800 | Consumer Products | 475 | Game |
| 800 | Consumer Products | 476 | Electronics |
| 800 | Consumer Products | 26 | Leisure Goods & Services |
| 800 | Consumer Products | 28 | Consumer Electronics |
| 800 | Consumer Products | 32 | Toys |
| 423 | Distributors & Contractors | 541 | Heating Contractors & Suppliers |
| 423 | Distributors & Contractors | 542 | Air Conditioning Contractors & Suppliers |
| 423 | Distributors & Contractors | 543 | Ventilation Contractors & Suppliers |
| 423 | Distributors & Contractors | 544 | Refrigeration Contractors & Suppliers |
| 423 | Distributors & Contractors | 545 | Air Quality Contractors & Suppliers |
| 423 | Distributors & Contractors | 546 | Air Cleaning & Dust Collection Contractors |
| 423 | Distributors & Contractors | 547 | Consulting Services |
| 661 | Energy | 28661 | Government & Agencies |
| 661 | Energy | 470 | Electric Power |
| 661 | Energy | 62 | Coal |
| 661 | Energy | 63 | Oil & Gas, Integrated |
| 661 | Energy | 64 | Oil Companies, Secondary |
| 661 | Energy | 65 | Oil Drilling, Equipment & Services |
| 661 | Energy | 66 | Pipelines |
| 661 | Energy | 212 | Solar Power |
| 661 | Energy | 211 | Wind Power |
| 639 | Entertainment | 209 | Motion Pictures |
| 639 | Entertainment | 27 | Casinos & Gaming |
| 639 | Entertainment | 456 | Sports |
| 821 | Environmental | 224 | Waste Management |
| 821 | Environmental | 222 | Water Technology & Services |
| 821 | Environmental | 223 | Toxic Waste |
| 821 | Environmental | 97 | Pollution Control |
| 667 | Financial | 131 | Specialty Funds |
| 667 | Financial | 68 | Banks |
| 667 | Financial | 70 | Savings & Loans |
| 667 | Financial | 71 | Financial Services |
| 667 | Financial | 72 | Diversified |
| 667 | Financial | 74 | Investment Services |
| 667 | Financial | 75 | Insurance |
| 667 | Financial | 76 | Insurance, Full-Line |
| 667 | Financial | 77 | Insurance, Life |
| 667 | Financial | 78 | Insurance, Property & Casualty |
| 647 | Food & Beverage | 60 | Tobacco |
| 647 | Food & Beverage | 49 | Beverages (Alcoholic) |
| 647 | Food & Beverage | 50 | Beverage (Non-Alcoholic) |
| 647 | Food & Beverage | 52 | Food Products |
| 647 | Food & Beverage | 56 | Food Retailers & Wholesalers |
| 647 | Food & Beverage | 31 | Restaurants |
| 647 | Food & Beverage | 400 | Food Service |
| 603 | Forest Products & Paper | 4 | Forest Products |
| 603 | Forest Products & Paper | 5 | Paper Products |
| 920 | Government Agencies | 325 | Postal |
| 920 | Government Agencies | 323 | Inspection/Testing Services |
| 920 | Government Agencies | 324 | Security, Policing, Rescue |
| 920 | Government Agencies | 321 | Embassies/Consulates |
| 920 | Government Agencies | 322 | Libraries |
| 679 | Healthcare | 80 | Biotechnology |
| 679 | Healthcare | 85 | Pharmaceuticals |
| 679 | Healthcare | 81 | Healthcare Providers |
| 679 | Healthcare | 82 | Medical Devices |
| 679 | Healthcare | 83 | Advanced Medical Supplies |
| 679 | Healthcare | 84 | Medical Supplies |
| 679 | Healthcare | 213 | Diversified |
| 657 | Household Products & Services | 58 | Household Products, Durable |
| 657 | Household Products & Services | 59 | Household Products, Nondurable |
| 657 | Household Products & Services | 54 | Consumer Services |
| 657 | Household Products & Services | 24 | Furnishings & Applicances |
| 657 | Household Products & Services | 410 | Domestic Animals |
| 657 | Household Products & Services | 481 | Security |
| 657 | Household Products & Services | 482 | Communications |

-continued

| ID | Industry | SubID | SubIndustry |
|---|---|---|---|
| 657 | Household Products & Services | 483 | Energy System |
| 657 | Household Products & Services | 484 | Satellite |
| 657 | Household Products & Services | 485 | Health Care |
| 657 | Household Products & Services | 486 | Data Networks |
| 690 | Industrial Goods & Services | 420 | Retailing Equipment |
| 690 | Industrial Goods & Services | 421 | Restaurant Equipment |
| 690 | Industrial Goods & Services | 422 | Restaurant Services |
| 690 | Industrial Goods & Services | 423 | Distributors & Contractors |
| 690 | Industrial Goods & Services | 215 | Security Systems & Services |
| 690 | Industrial Goods & Services | 216 | Metal Fabrication |
| 690 | Industrial Goods & Services | 96 | Industrial Services |
| 819 | Machinery & Equipment | 94 | Electric Component & Equipment |
| 819 | Machinery & Equipment | 98 | Industrial Equipment |
| 819 | Machinery & Equipment | 99 | Factory Equipment |
| 819 | Machinery & Equipment | 100 | Construction & Agri Machinery |
| 819 | Machinery & Equipment | 91 | Advanced Industrial Equipment |
| 819 | Machinery & Equipment | 416 | Restaurant Equipment/Services |
| 819 | Machinery & Equipment | 415 | Food Processing |
| 840 | Marine | 363 | Ship Building, Repair, Towing |
| 840 | Marine | 361 | Marinas & Service |
| 840 | Marine | 362 | Marine Equipment |
| 840 | Marine | 360 | Sales: Pleasure Craft |
| 840 | Marine | 241 | Power Boats |
| 636 | Media & Publishing | 208 | Printing |
| 636 | Media & Publishing | 207 | Diversified |
| 636 | Media & Publishing | 37 | Advertising |
| 636 | Media & Publishing | 38 | Broadcasting & Cable |
| 636 | Media & Publishing | 40 | Publishing |
| 606 | Mining & Metals | 7 | Aluminum |
| 606 | Mining & Metals | 8 | Mining |
| 606 | Mining & Metals | 11 | Steel |
| 606 | Mining & Metals | 9 | Nonferrous Metals |
| 606 | Mining & Metals | 10 | Precious Metals |
| 900 | Not for Profit | 304 | Associations |
| 900 | Not for Profit | 305 | Cultural |
| 900 | Not for Profit | 301 | CO-OPs |
| 900 | Not for Profit | 302 | Service Clubs |
| 900 | Not for Profit | 303 | Foundations |
| 880 | Personal & Family Services | 293 | Weddings |
| 880 | Personal & Family Services | 281 | Medical/Health |
| 880 | Personal & Family Services | 282 | Family/Support |
| 880 | Personal & Family Services | 283 | Regigious/Churches |
| 880 | Personal & Family Services | 284 | Rehabilitation |
| 880 | Personal & Family Services | 285 | Adoption |
| 880 | Personal & Family Services | 286 | Addiction |
| 880 | Personal & Family Services | 287 | Fitness |
| 880 | Personal & Family Services | 288 | Employment/Career |
| 880 | Personal & Family Services | 289 | Children's Services |
| 880 | Personal & Family Services | 290 | Funeral/Cemeteries |
| 880 | Personal & Family Services | 291 | Dating |
| 880 | Personal & Family Services | 292 | Education |
| 805 | Personal Products | 453 | Jewelry |
| 805 | Personal Products | 35 | Footwear |
| 805 | Personal Products | 34 | Clothing & Fabrics |
| 805 | Personal Products | 55 | Cosmetics & Personal Care |
| 850 | Professional Services | 251 | Legal |
| 850 | Professional Services | 252 | Accounting |
| 850 | Professional Services | 253 | Human Resources |
| 850 | Professional Services | 254 | Engineering |
| 850 | Professional Services | 255 | Financial |
| 850 | Professional Services | 256 | Architectural |
| 850 | Professional Services | 257 | Appraisal |
| 850 | Professional Services | 258 | Arbitration |
| 850 | Professional Services | 259 | Actuarial |
| 850 | Professional Services | 260 | Insurance Adjusters/Claims |
| 850 | Professional Services | 261 | Graphic Arts |
| 850 | Professional Services | 263 | Credit & Collection |
| 850 | Professional Services | 264 | Security |
| 850 | Professional Services | 530 | Consulting |
| 850 | Professional Services | 510 | Marketing |
| 850 | Professional Services | 520 | Public Relations |

-continued

| ID | Industry | SubID | SubIndustry |
|---|---|---|---|
| 850 | Professional Services | 265 | Communications |
| 850 | Professional Services | 267 | Customs/Transportation |
| 850 | Professional Services | 268 | Media/Advertising |
| 850 | Professional Services | 269 | Consulting: Other |
| 673 | Real Estate | 350 | Developers |
| 673 | Real Estate | 351 | Sales & Rental Agents |
| 673 | Real Estate | 354 | Parking Facilities |
| 673 | Real Estate | 352 | Property Management |
| 673 | Real Estate | 353 | Property Maintenance |
| 641 | Retail | 430 | Building/Hardware |
| 641 | Retail | 439 | Travel Agents |
| 641 | Retail | 431 | Gardening/Horticulture |
| 641 | Retail | 432 | Rentals |
| 641 | Retail | 433 | Financial |
| 641 | Retail | 434 | Consumer Electronics |
| 641 | Retail | 435 | Sporting Goods |
| 641 | Retail | 436 | Office Equipment, Supplies |
| 641 | Retail | 437 | Toys |
| 641 | Retail | 438 | Other |
| 641 | Retail | 229 | Retailers, Food |
| 641 | Retail | 210 | Retailers, Catalog & Mail |
| 641 | Retail | 42 | Apparel |
| 641 | Retail | 43 | Broadline |
| 641 | Retail | 44 | Drug-based |
| 641 | Retail | 45 | Specialty |
| 707 | Technology & Software | 114 | Office Equipment |
| 707 | Technology & Software | 115 | Technology Services |
| 707 | Technology & Software | 116 | Diversified Technology Services |
| 707 | Technology & Software | 117 | Internet Services |
| 707 | Technology & Software | 109 | Communications Technology |
| 707 | Technology & Software | 110 | Semiconductors |
| 707 | Technology & Software | 111 | Software |
| 707 | Technology & Software | 112 | Software: Transportation |
| 707 | Technology & Software | 113 | Computers |
| 707 | Technology & Software | 487 | Office |
| 718 | Telecommunications | 119 | Fixed-Line Communications |
| 718 | Telecommunications | 120 | Wireless Communications |
| 804 | Textiles | 33 | Textiles & Apparel |
| 701 | Transportation | 22 | Airlines |
| 701 | Transportation | 106 | Trucking |
| 701 | Transportation | 104 | Marine Transport |
| 701 | Transportation | 105 | Railroads |
| 701 | Transportation | 102 | Air Freight |
| 701 | Transportation | 103 | Land Transportation Equipment |
| 701 | Transportation | 220 | Couriers |
| 701 | Transportation | 440 | Logistics |
| 701 | Transportation | 441 | Customs & Brokerage |
| 701 | Transportation | 442 | Schools |
| 701 | Transportation | 451 | Moving & Storage |
| 701 | Transportation | 443 | Human Resources |
| 701 | Transportation | 450 | Taxi, Livery, Buses |
| 801 | Travel & Recreation | 458 | Sports & Leisure |
| 801 | Travel & Recreation | 203 | Travel Services |
| 801 | Travel & Recreation | 202 | Cruise Lines |
| 801 | Travel & Recreation | 29 | Hotels & Lodging |
| 801 | Travel & Recreation | 30 | Recreational Products & Services |
| 721 | Utilities | 124 | Water Utilities |
| 721 | Utilities | 122 | Electric Utilities |
| 721 | Utilities | 123 | Gas Utilities |

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for gathering and classifying information from the world wide web, the method comprising the steps of:

providing an industry database containing a multi-level classification of industry groups, each of said industry groups having a set of associated industry group keywords;

providing a company database containing a plurality of company profiles, each company profile containing identifying information and an association with one or more of said industry groups;

extracting information from a website;

determining a data type for said extracted information;

comparing said extracted information with said identifying information from said plurality of company profiles and, if the identifying information is found within the extracted information for at least one company profile, then associating the extracted information with the at least one company and associating the extracted information with the one or more of said industry groups associated with the at least one company profile, and if the identifying information is not found within the extracted information, comparing said extracted information with said set of associated industry group keywords for each of said industry groups, and, if the extracted information is found to have at least a threshold degree of relevance to at least one industry group, selecting a most relevant industry group and associating the extracted information with the most relevant industry group, wherein said step of comparing said extracted information with said set of associated industry group keywords comprises filtering said extracted information to produce a subset of extracted information, and searching said subset for said associated industry group keywords, wherein said step of comparing said extracted information with said set of associated industry group keywords further comprises counting matches from said searching step to produce a match count, normalizing said match count over the size of the subset to generate a degree of relevance, and comparing said degree of relevance to said threshold degree of relevance, and wherein said step of filtering includes at least applying a common word filter to remove common words; and storing said extracted information as a data record within an information database, including at least one association with at least one industry group.

2. The method claimed in claim 1, wherein said step of providing said company database includes extracting new information, determining that said new information is from an unknown site, determining a type of site, building a new company profile based on said new information if said type of site is determined to be a company website, and adding said new company profile to said company database.

3. The method claimed in claim 2, wherein said step of building includes extracting corporate information from said new information regarding name, address, country, and line-of-business from said website and populating said new company profile with said corporate information.

4. The method claimed in claim 1, wherein said data type is selected from a type consisting of news, government, trade event, and stock exchange information.

5. The method claimed in claim 1, further including steps of receiving user selections, building a user profile based upon said user selections, filtering said data records based upon said user profile to identify desired data records, generating a report for said user referencing said desired data records, and wherein said user selections include one or more of said industry groups, and wherein said step of filtering includes selecting said data records related to said one or more of said industry groups based upon said at least one association with at least one industry group.

6. A system for gathering and classifying information from the world wide web, the system comprising:

at least one memory storing an industry database containing a multi-level classification of industry groups, each of said industry groups having a set of associated industry group keywords, a company database containing a plurality of company profiles, each company profile containing identifying information and an association with one or more of said industry groups, and an information database containing data records, each of said data records including at least one association with at least one industry group;

an extractor for crawling the world wide web and producing extracted information from at least one website;

a classifier for receiving said extracted information, said classifier including a data type component configured to determine a data type for said extracted information;

a company comparison component configured to compare said extracted information with said identifying information from said plurality of company profiles and, if the identifying information is found within the extracted information for at least one company profile, then associate the extracted information with the at least one company and associate the extracted information with the one or more of said industry groups associated with the at least one company profile;

an industry component configured to compare said extracted information with said set of associated industry group keywords for each of said industry groups if the company comparison component finds the identification information is not found within the extracted information, and wherein the industry component is configured to select a most relevant industry group and associated the most relevant industry group with the extracted information if the extracted information is found to have at least a threshold degree of relevance to at least one industry group, wherein said industry component includes one or more filters for filtering said extracted information to produce a subset of extracted information and wherein said industry component is configured to search said subset for said associated industry group keywords, wherein said industry component is configured to count matches from said search of said subset to produce a match count, to normalize said match count over the size of the subset to generate a degree of relevance, and to compare said degree of relevance to said threshold degree of relevance, and wherein said at least one filters include a common word filter to remove common words; and wherein said classifier is configured to store said extracted information as one of said data records within said information database.

7. The system claimed in claim 6, wherein said classifier further includes a company profile builder configured to receiving new information from said extractor, determine that said new information is from an unknown site, determine a type of site, build a new company profile based on said new information if said type of site is determined to be a company website, and add said new company profile to said company database.

8. The system claimed in claim 7, wherein said company profile builder is configured to extract corporate information from said new information including name, address, country, and line-of-business from said company website and populating said new company profile with said corporate information.

9. The system claimed in claim 6, wherein said data type is selected from a type consisting of news, government, trade event, and stock exchange information.

10. The system claimed in claim 6, further including a report generator and a memory storing a user profile, said user profile containing user selections, and wherein said report generator is configured to filter said data records based upon said user profile to identify desired data records, generate a report for said user referencing said desired data records, and wherein said user selections include one or more of said industry groups, and wherein said report generator is configured to filter said data records related to said one or more of said industry groups based upon said at least one association with at least one industry group.

* * * * *